US007414813B2

(12) United States Patent
Huynh

(10) Patent No.: US 7,414,813 B2
(45) Date of Patent: Aug. 19, 2008

(54) VIBRATION DAMPED FLEXIBLE CIRCUIT FOR USE IN A HARD DISK DRIVE

(75) Inventor: Duane Q. Huynh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 428 days.

(21) Appl. No.: 10/603,419

(22) Filed: Jun. 24, 2003

(65) Prior Publication Data

US 2004/0264058 A1    Dec. 30, 2004

(51) Int. Cl.
   *G11B 5/55*    (2006.01)
(52) U.S. Cl. .................................. 360/264.2
(58) Field of Classification Search ............. 360/245.8, 360/245.9, 244.1, 244.8, 244.9, 264.2, 244.2, 360/244.3, 244.4, 26.3, 263.3
   See application file for complete search history.

(56) References Cited

U.S. PATENT DOCUMENTS

| 5,526,208 | A | 6/1996 | Hatch et al. ................. 360/109 |
| 5,572,387 | A | 11/1996 | Brooks, Jr. et al. .......... 360/104 |
| 5,594,607 | A | 1/1997 | Erpelding et al. ............ 360/104 |
| 5,606,477 | A | 2/1997 | Erpelding et al. ............ 360/104 |
| 5,717,541 | A | 2/1998 | Ycas et al. ............... 360/97.01 |
| 5,796,553 | A | 8/1998 | Tangren ...................... 360/104 |
| 5,875,072 | A | 2/1999 | Brooks, Jr. et al. .......... 360/104 |
| 5,907,452 | A | 5/1999 | Kan ........................ 360/97.01 |
| 5,909,342 | A | 6/1999 | Forbord et al. ............... 360/106 |
| 5,936,808 | A | 8/1999 | Huang et al. ................. 360/106 |
| 5,965,249 | A | 10/1999 | Sutton et al. ............. 428/304.4 |
| 6,091,574 | A | 7/2000 | Misso ........................ 360/104 |
| 6,146,813 | A * | 11/2000 | Girard et al. ................. 430/319 |
| 6,163,443 | A * | 12/2000 | Hatagami et al. ........... 360/323 |
| 6,310,746 | B1 | 10/2001 | Hawwa et al. ............ 360/97.01 |
| 6,351,348 | B1 * | 2/2002 | Erpelding et al. ......... 360/244.3 |
| 6,485,241 | B1 * | 11/2002 | Oxford ........................ 411/339 |
| 6,563,676 | B1 * | 5/2003 | Chew et al. ............... 360/264.7 |
| 2003/0086214 | A1 * | 5/2003 | Shin ........................ 360/266.3 |
| 2003/0235012 | A1 * | 12/2003 | Nishizawa ............... 360/264.2 |

* cited by examiner

*Primary Examiner*—Hoa T. Nguyen
*Assistant Examiner*—Tianjie Chen
(74) *Attorney, Agent, or Firm*—Zilka-Kotab, PC

(57) ABSTRACT

A method and apparatus for damping vibration in a flexible cable for use in a magnetic disk drive apparatus. The vibration damping mitigates resonant oscillation of the flexible cable which would otherwise cause tracking errors by forcing the actuator of the away from the desired data track on a magnetic disk. A layer vibration damping material and one or more electrical leads are enclosed within a surrounding electrical insulator, the damping material being completely enclosed, while the leads have selected portions exposed to allow electrical connection devices.

9 Claims, 5 Drawing Sheets

VIBRATION DAMPED FLEXIBLE CIRCUIT FOR USE IN A HARD DISK DRIVE

BACKGROUND OF THE INVENTION

1. Field of the Invention

The present invention relates to vibration damping in a hard disk drive device, and more particularly to a vibration damped flexible circuit for use in such a disk drive device.

2. Description of the Related Art

Moving magnetic storage devices, especially magnetic disk drives, are in prevalent use in computer systems, due in large part to their ability to inexpensively store large quantities of non-volatile data for quick access. Magnetic disk drives utilize at least one rotatable magnetic media disk having concentric data tracks defined for storing data, a magnetic recording head or transducer for reading data from and/or writing data to the various data tracks, a slider for supporting the transducer in close proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider suspension assembly to the actuator. The actuator positions the transducer over the correct track according to the data desired for a read operation or to the correct track for placement of the data during a write operation. The actuator is controlled to position the transducer over the desired data track by moving the transducer across the surface of the disk in a direction generally transverse to the data tracks. The actuator may include a single arm extending from a pivot point, or alternatively a plurality of arms arranged in a comb-like fashion extending from a pivot point. A rotary voice coil motor (VCM) is attached to the rear portion of the actuator arm or arms to power movement of the actuator over the disks. The term seek refers generally to the radial movement of the head or transducer to a specified track on the disk.

The VCM located at the rear portion of the actuator arm is comprised of a top plate spaced above a bottom plate with a magnet or pair of magnets therebetween. The VCM further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus position the transducer as desired.

The magnetic media disk or disks in the disk drive are mounted to a spindle. The spindle is attached to a spindle motor, which rotates the spindle and the disks to provide read/write access to the various portions on the concentric tracks on the disks. One or more electrical conductors extend over the suspension assembly to electrically connect the read/write transducer to a read/write chip on the actuator arm. A multi-line flexible printed circuit cable (actuator flex cable) provides the electrical contact between the read/write chip and other circuitry located outside the disk drive housing. Inside the disk drive housing, the actuator flex cable connects to an electrical connector pin assembly, which in turn, through an opening or connector port in the housing, connects to the external electronics.

The actuator flex cable is a flexible circuit that carries electrical signal to and from the actuator. It is typically comprised of a plurality of electrical conductors encapsulated within an insulating material. The actuator flex cable provides electrical contact from the external electronics fixed to the disk drive housing to the actuator which is supported on bearings allowing radial motion of the actuator about its pivot point. The radial motion of the actuator allows the read/write transducers supported on suspensions fixed to the actuator to access data tracks on the disk surfaces located at any radial position from the inside diameter of the disk to the outside diameter of the disk. The preferred method of fixing the actuator flex cable between the electronics card on the fixed disk drive housing and the rotatable actuator is to form the actuator flex cable in a loop so that the actuator flex cable causes minimal constraint on the actuator rotation. The loop of the actuator flex cable connecting the actuator with the electronics card can vibrate during seeking of the actuator, introducing unwanted vibration modes to the actuator. Vibration (often referred to as random transient vibration) of the actuator during seek operations degrades settling performance of the disk drive.

There have been attempts in the prior art to minimize the affects of flex cable vibration on the actuator or head carriage assembly positioning. For example, U.S. Pat. No. 5,907,452 issued to Kan discloses attaching a damper at one end of the flex cable, the damper being a component external to and separate from the flex cable. Those skilled in the art will appreciate that the additional components added by the prior art necessarily increase the cost and complexity of such device, and in some cases increase the risk that the added components may become dislodged resulting in a catastrophic failure of the disk drive. In addition such a device only provides damping to a portion of the flex cable. Therefore, there remains a need for a means for effectively damping vibration in a flexible cable of a disk drive device, while minimizing the use of addition components. Such a device would preferably make use of existing manufacturing techniques as much as possible.

SUMMARY OF THE INVENTION

The present invention provides a vibration damped, flexible cable for use in a magnetic data recording device such as a hard disk drive. The flexible cable includes one or more electrical leads and a layer of vibration damping material both surrounded by an electrical insulator.

The vibration damping material can be disposed adjacent to the leads, being sandwiched between the leads and the insulation layer. Since the damping layer is disposed within the insulation of the flex cable, there is no risk of the damping material coming loose from the flex cable. Other problems, such as outgassing and debris accumulation are also avoided. In addition, the present invention allows great flexibility in the amount and placement of damping material within the flex cable, such that essentially the entire flex cable can be damped with such material if desired. Preferably, the damping material covers an area of at least ⅓ the area of the flexible cable. Also, the shape of the flexible cable can vary along its length according to performance requirements. For example, the width along a lateral direction or thickness in a height direction can vary in order to place more damping material at locations that require greater vibration damping.

The electrical leads can be formed of a metal such as copper and the damping material can comprise, for example, ISD130™ made by 3M Corporation. The insulator can be constructed of a flexible electrical insulator such as Kapton™. In one possible embodiment, a second layer of damping material can be included, for example on the side of the leads opposite that of the first insulation layer.

The flex cable of the present invention can be constructed using existing manufacturing techniques. The leads can be applied onto a first layer of insulating material. Then, the vibration damping layer can be deposited onto the leads. A second layer of insulating material can then be applied over the first insulation layer, leads and vibration damping material. The application of heat and pressure can be used to bond the materials together, encasing the leads and the damping material within the surrounding insulation.

BRIEF DESCRIPTION OF THE FIGURES

For a fuller understanding of the nature and advantages of the present invention, as well as the preferred mode of use, reference should be made to the following detailed description read in conjunction with the accompanying drawings, wherein.

DETAILED DESCRIPTION OF THE PREFERRED EMBODIMENTS

Figure 1:
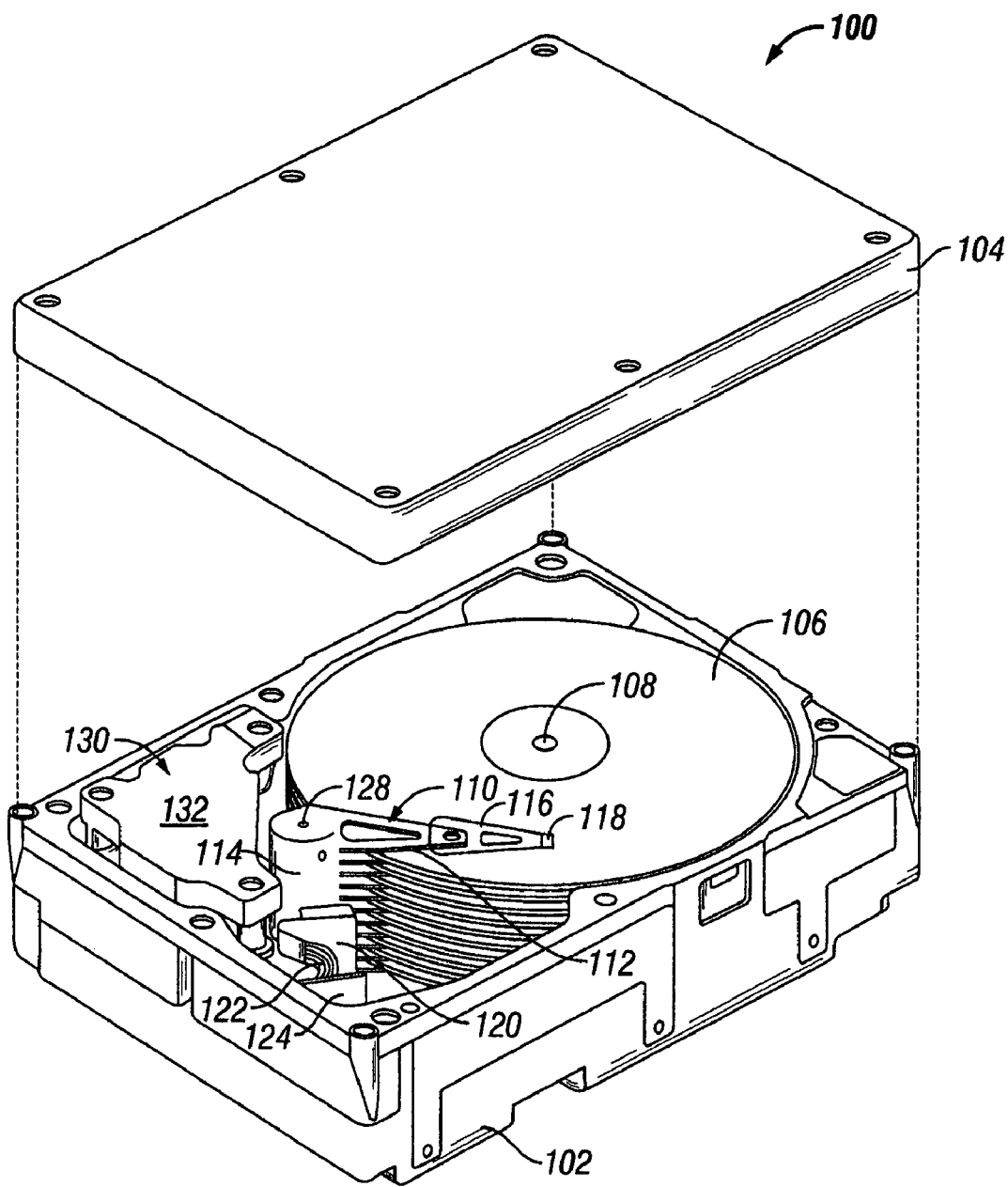
FIG. 1, is a perspective view of a disk drive according to an embodiment of the invention, shown with a removed cover in order to depict components therein.

With reference to FIG. 1, a disk drive apparatus, generally referred to as 100 includes a housing 102 and a lid 104, which is shown removed in order to describe various component within the housing 102. The disk drive 100 includes one or more magnetic disks 106 on the surface of which digital data can be stored as magnetic signals formed along concentric tracks. In a preferred embodiment, both sides of the disk 106 would have such data stored thereon, and those skilled in the art will recognize that any number of such disks 106 may be included in the disk drive 100.

The disks 106 are mounted to a spindle 108, which is connected with a spindle motor (not shown), which rotates the disk 106 within the housing 102. An actuator assembly 110 includes an actuator arm 112, integrally connected with an E-block, or comb 114, and a suspension assembly 116. The suspension assembly 116 includes a slider/transducer assembly 118 at its distal end and for movement across the surface of the disk 106. While only one suspension assembly 116 is shown, those skilled in the art will appreciate that the disk drive 100 would include a suspension 116 for each side of each disk 106.

The disk drive 100 further includes an amplifier circuit chip 120. The amplifier chip 120 cooperates with the slider/transducer assembly 118 to read data from or write data to the disks 106. A flexible printed circuit member or actuator flex cable 122 carries signals between the amplifier chip 120 and a connector pin assembly (not shown) attached to the disk housing 102, which interfaces with the external signal processing electronics. The actuator flex cable 122 leading from the amplifier chip 120 is attached to an arm electronics (AE) bracket 124 which directs the actuator flex cable 122 to a connector port for connection to a connector pin assembly (not shown).

Figure 2:
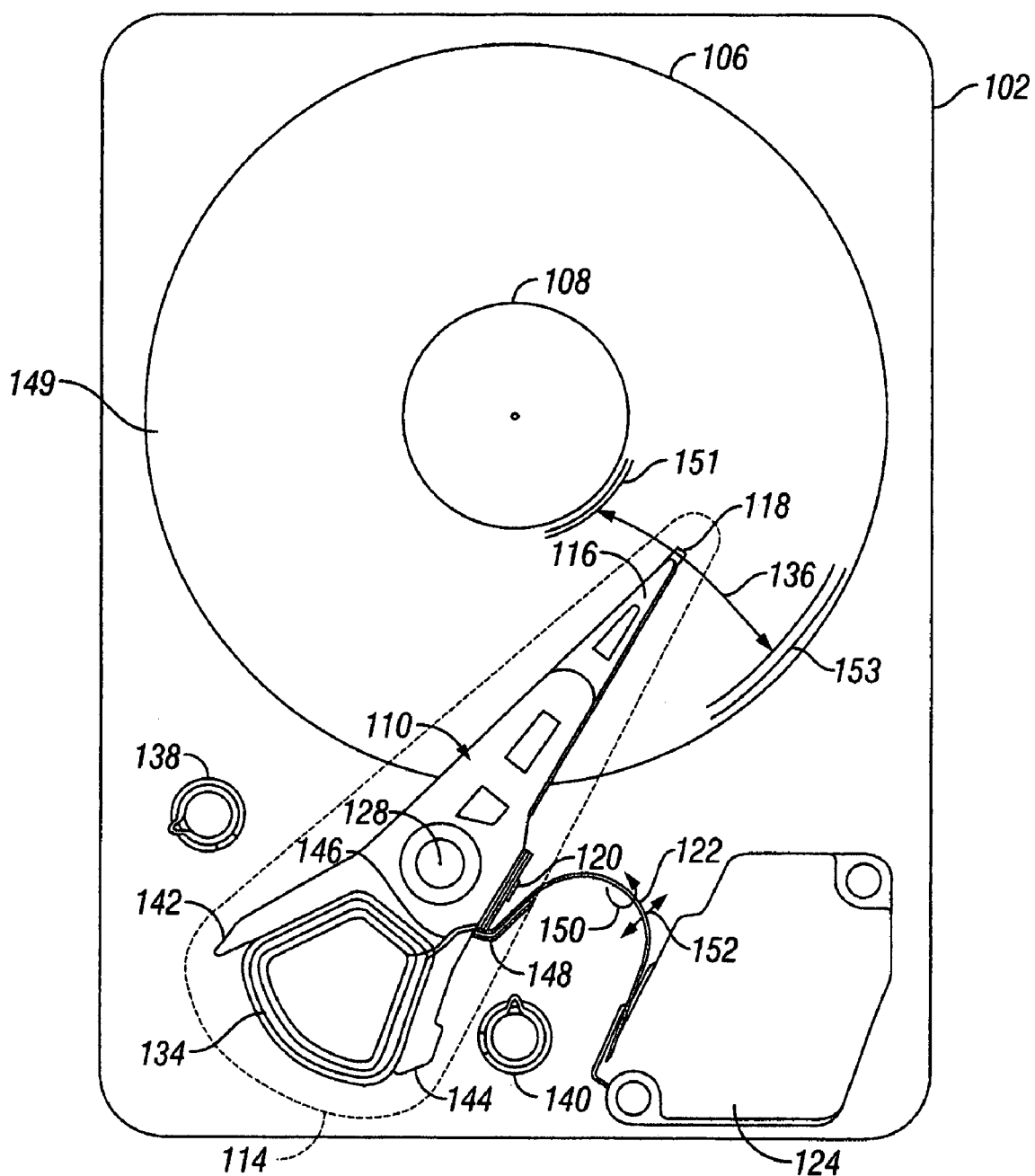
FIG. 2 is a plan view of a disk drive according to an embodiment of the present invention.

The actuator assembly 110 is mounted on a pivot bearing 126 for pivotal movement about a pivot point 128, and functions to position the transducer 118 over selected data tracks on the disk 106. The actuator assembly 110 includes a voice coil motor assembly 130, which comprises a bottom plate (not shown), a magnet (not shown) a top plate 132, and a coil 134 (FIG. 2). Current passing through the actuator coil interacts with the magnetic field of the magnet to rotate the E-block 114, and suspension assembly about the pivot point 128, to thereby position the transducer 118 as desired over the disk 106.

With reference now to FIG. 2, a plan view of the disk drive illustrates the location of the actuator assembly 110 relative to the disk 106 and housing 102. The pivotal motion of the actuator assembly 110 and suspension assembly 116 across the surface 149 of the disk 106 is indicated by arrow 136. The motion of the actuator 110 is limited by contact between stops 138, 140, and rearward extensions or VCM coil support arms 142, 144. Conductive coil leads 146 provide electrical connection of the VCM coil 134 to the actuator flex cable 122 near to the amplifier chip 120. The limits of the actuator assembly rotation define the inner diameter (ID) track 151 and the outer diameter track 153 on the disk surface 149 that may be accessed by the slider transducer assembly 118.

The actuator flex cable 122 is fixed to the actuator assembly 110 at a J-shaped fixture (J-block) 148, which provides support for the actuator flex cable 122, and directs the cable to form a self supported arc or loop between the actuator assembly 110 and the AE bracket 124. The loop formed by the flex cable 122 provides mechanical isolation for the actuator assembly 110 allowing rotary motion of the actuator assembly 118 during operation of the disk drive 100 with minimal mechanical constraint.

Disk drive performance as measured by track misregistration (TMR) is degraded by vibration of components within the disk drive. In particular, movement of the actuator arm 112 over a selected track can set up oscillations in the flex cable 122 due to inertial and elastic (spring) properties of the flex cable itself. These oscillations can be torsional as well as lateral, as indicated by arrows 150 and 152 respectively and act to force the actuator arm 112 away from its intended position over the desired track.

Figure 3:
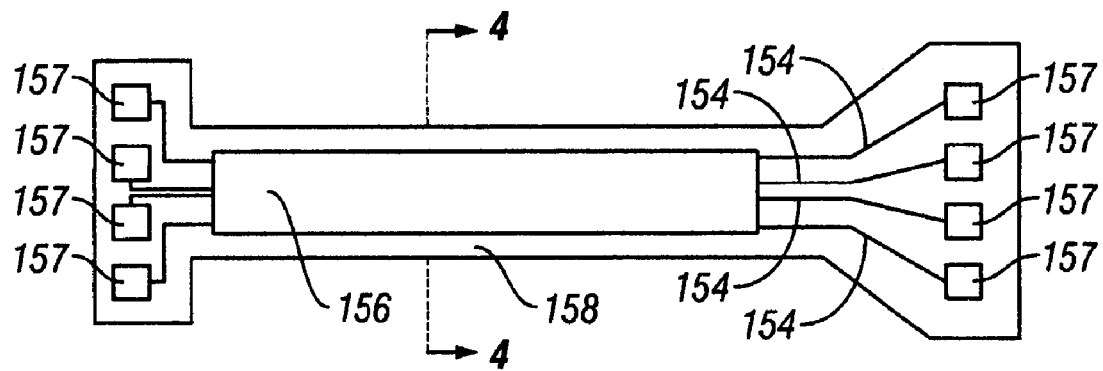
FIG. 3 is a plan view of a flexible cable according to an embodiment of the invention shown with an upper portion of its insulation layer removed in order to illustrate components therein.
Figure 4A:
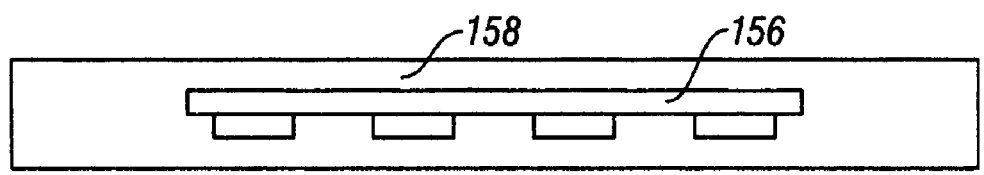
FIG. 4 is a cross sectional view taken along line 4-4 of FIG. 3, shown enlarged and rotated 90 degrees counterclockwise.

With reference to FIGS. 3 and 4, which show plan and sectional views of a flex cable 122 according to a preferred embodiment of the present invention, a vibration damping material integrated within the flex cable minimizes the previously described problems associated with resonant oscillation of the flex cable 122. The flex cable as illustrated in FIG. 3 is shown extended flat and with an upper portion of its insulation layer removed in order to illustrate the components therein. The flex cable 122 of the present invention includes a plurality of conductive lines or leads 154 and a layer of vibration damping material 156 formed adjacent to the leads 154. Both the leads 154 and vibration damping material layers 156 are encased within a flexible electrically insulating material 158, with selected end portions of the leads being exposed to form contact pads 157 to allow for electrical contact with the amplifier circuit chip 120 and the connector pin assembly. For purposes of clarity, the flexible cable 122 is shown as having four electrical leads 154, however, those skilled in the art will appreciate that the flexible cable 122 would likely include many more such leads. The damping material layers 156 can be formed in many different shapes and sizes within the cable 122, as necessitated by design requirements. Preferably, however, the damping material covers an area at least ⅓ the area of the flexible cable 122 when viewed from above as in FIG. 3. More preferably, the damping material covers an area that is at least ½ the area of the flexible cable 122. The damping material 156 could also be configured to be wider or thicker in areas where more damping is required and narrower or thinner elsewhere.

Materials used for vibration damping should exhibit large viscous losses in response to deformation. As will be appreciated by those skilled in the art, these losses are typically quantified in terms of a dynamic loss modulus. The vibration damping material 156 used in the flexible cable 122 of the present invention is preferably a material having a nominal dynamic loss modulus of 50% to 110%. Several materials are available for use as a vibration damping material 156. Preferably, the vibration damping material is ISD130™, produced by 3M™ Corporation. Alternatively, ISD110™ or ISD112™, also produced by 3M Corporation can be used, as well as equivalent materials produced by ANATROL™ Corporation. While the vibration damping layer 156 is shown as being formed along one side of the leads 154, it could be formed on either side or on both sides of the leads 154 depending on design considerations such as cost and vibration damping requirements. The electrical leads can be formed of many electrically conductive materials, and in the preferred embodiment they are formed of copper. The material chosen to construct the insulation layer 158 can be selected from among many flexible, electrically insulating materials, and in the preferred embodiment is KAPTON™.

Figure 5A:
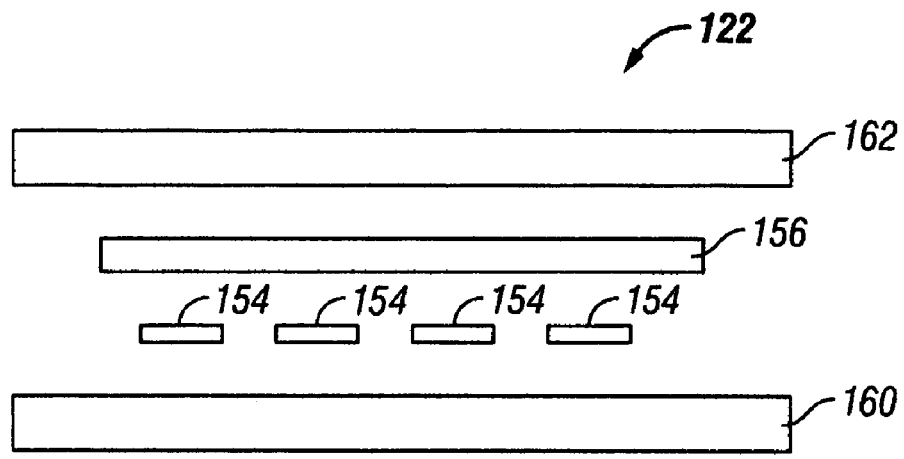
FIGS. 5a and 5b are exploded cross section views of components used to construct a flex cable according to the present invention.
Figure 5B:
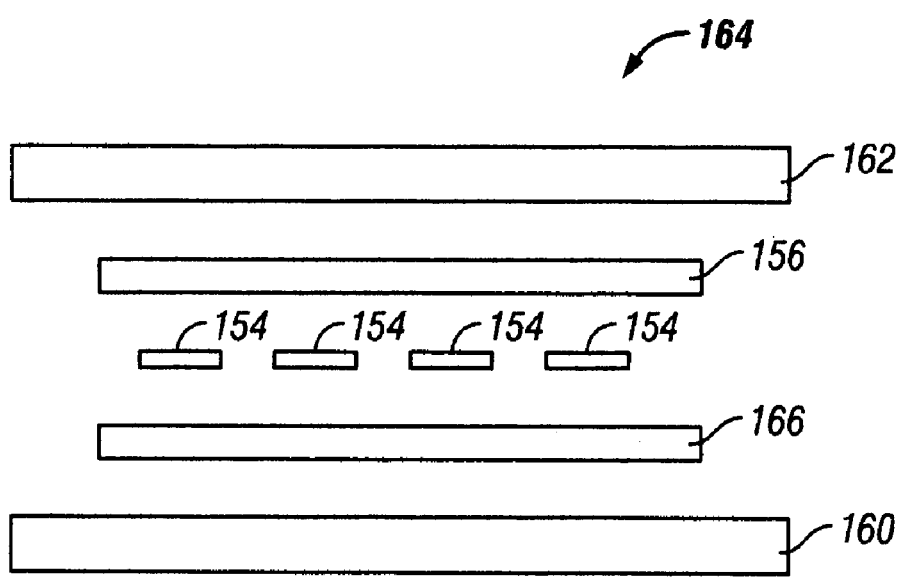
Figure 6A:
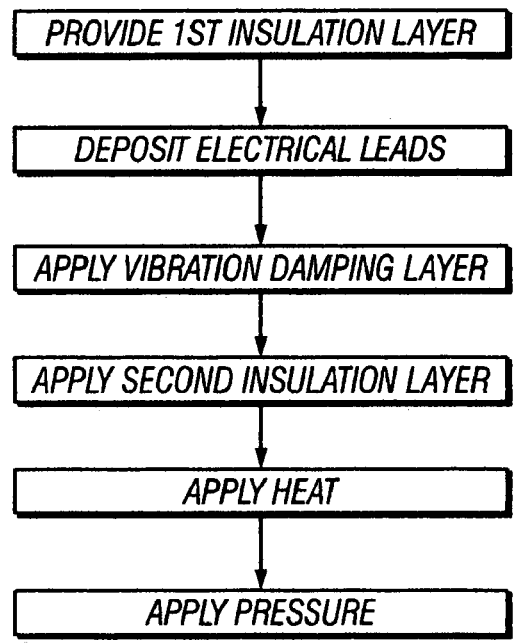
FIGS. 6a and 6b are flow charts illustrating a method of making the present invention.

With reference now to FIGS. 5 and 6, a method of constructing a flex cable 122 of the present invention will be described. Prior art flex cables are constructed by sandwiching a plurality of electrical leads between two electrically insulating films and applying heat and pressure to bond the insulating films to one another and to the leads. Advantageously, the flex cable of the present invention can be constructed in much the same way as prior art flex cables, allowing the use of existing tooling and processes. In a step 602, a first electrically insulating film 160 is formed. Then, in a step 604 the leads 154 are applied to the first insulating film layer 160. In a step 164, the vibration damping material 156 is applied to the leads 154 and the first film 160. Thereafter, in a step 608 a second layer of insulating film 162 is applied onto the first film 160, leads 154 and damping material 156. In steps 610 and 612, heat and pressure are applied to the flex cable 122 to bond the layers together, encasing the leads 154 and damping material 156 within the insulating material as illustrated in FIG. 3. Steps 610 and 612 may be conducted simultaneously or separately depending on the type of bonding performed. Alternatively, with the use of certain adhesives, the heating step may be eliminated and bonding may be achieved by the application of pressure alone.

As will be appreciated by those skilled in the art, encasing the damping material within the insulating material 158 provides several advantages over a design having a damper externally attached to the flex cable. For example, existing damping materials are sticky materials and as such would tend to collect debris if attached externally. In addition, encasing the damping material within the insulation 158 of the flex cable assures that the damping material will not detach from the flex cable 122. A detached damper being loose with in the disk drive 100, would not only eliminate any advantageous damping effect, but would likely lead to a catastrophic failure of the drive 100. Also, since the flex cable of the present invention can be manufactured with minimal deviation from existing manufacturing methods it can be easily and inexpensively manufactured. Furthermore, encasing the damping material 156 within the insulating material 158 eliminates any problems associated with outgassing of the damping material over time.

Figure 4B:
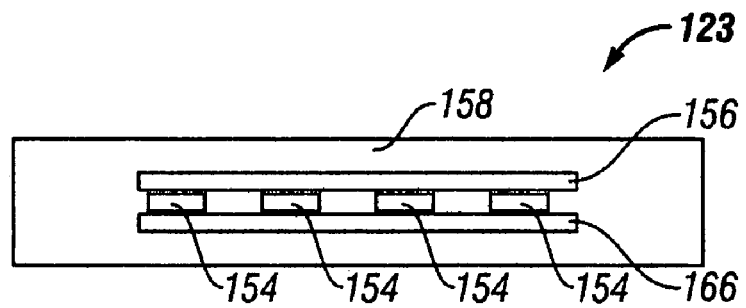
Figure 6B:
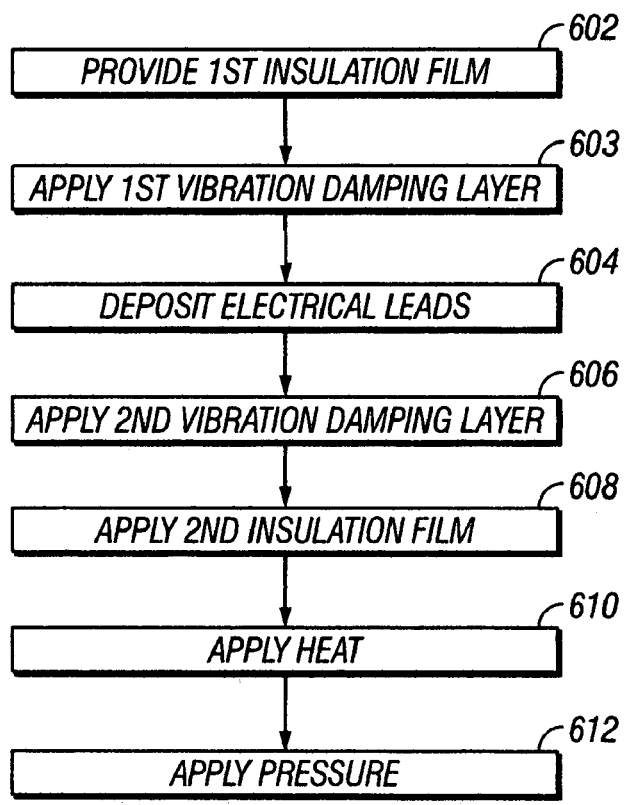

With reference to FIG. 4b, a possible alternate embodiment of the invention is described. A flexible cable 164 according to this embodiment includes first and second damping layers 156, 166, sandwiching the electrical leads 154 therebetween. The first and second damping layers 156, 166 and the electrical leads 154 are sandwiched between the first and second insulating layers 162, 160. With reference to FIGS. 5b and 6b a method for constructing a flexible cable 164 according to this alternate embodiment of the invention includes, in a step 602, providing a first insulation film 162. Thereafter, in a step 603 a first vibration damping layer 156 is applied. Then, in a step 604, the electrical leads 154 are applied. Then, in a step 606, a second layer of vibration damping material 606 is applied. In a step 608, the second insulation layer 160 is applied. Then, in steps 610 and 612, heat and pressure are applied to bond the previously described elements together.

While the preferred embodiments of the present invention have been illustrated herein in detail, it should be apparent that modifications and adaptations to those embodiments may occur to those skilled in the art without departing from the scope of the present invention, which is to be limited only as set forth in the following claims.

What is claimed is:

1. A head suspension assembly for use in a magnetic recording device comprising:
   a suspension;
   a magnetic transducer connected with the suspension; and
   a flexible cable electrically connected with the transducer, the flexible cable further comprising:
      an electrically conductive lead;
      a vibration damping material disposed adjacent to the electrical lead; and
      an insulating material surrounding the vibration damping material and at least a portion of the electrical lead wherein the vibration damping material is configured with relatively wider portions where additional damping is needed and relatively narrower portions elsewhere; and wherein
      the damping material covers an area at least ⅓ the area of the flexible cable.

2. A magnetic hard disk drive, comprising:
   a housing;
   a magnetic disk rotationally mounted within the housing;
   an amplifier circuit; and
   a flexible cable electrically connected with the amplifier circuit, the flexible cable further comprising:
      an electrically conductive lead;
      a vibration damping material disposed adjacent to the electrical lead; and
      an insulating material surrounding the vibration damping material and at least a portion of the electrical lead wherein the vibration damping material is configured with relatively wider portions where additional damping is needed and relatively narrower portions elsewhere and wherein the damping material covers an area at least ⅓ the area of the flexible cable.

3. A flexible cable for use in a magnetic memory device, comprising:
a first layer of electrically insulating material;
a second layer of electrically insulating material;
an electrical lead; and
a vibration damping material;
wherein the electrical lead and the vibration damping material are sandwiched between the first and second layer of electrically insulating material and wherein the vibration damping material is configured with relatively wider portions where additional damping is needed and relatively narrower portions elsewhere;
and wherein the damping material covers an area at least ⅓ the area of the flexible cable.

4. A damped flexible cable for use in a magnetic memory device, comprising;
an electrically conductive lead;
a vibration damping material disposed adjacent to the electrical lead; and
an insulating material surrounding the vibration damping material and at least a portion of the electrical lead, wherein the vibration damping material is configured to be relatively wider in areas wherein more damping is required and relatively narrower elsewhere; and wherein the damping material covers an area at least ⅓ the area of the flexible cable.

5. A damped flexible cable for use in a magnetic memory device, comprising:
an electrically conductive lead;
a vibration damping material disposed adjacent to the electrically conductive lead; and
an insulating material surrounding the vibration damping material and at least a portion of the electrically conductive lead, wherein the vibration damping material is configured to be relatively thicker in areas wherein more damping is required and relatively thinner elsewhere; and wherein the damning material covers an area at least ⅓ the area of the flexible cable.

6. A damped flexible cable as recited in claim 4 or 5 wherein the vibration damping material is completely enclosed within the insulation, and wherein end portions of the electrically conductive lead are exposed.

7. A damped flexible cable as recited in claim 4 or 5 wherein the vibration damping material includes first and second layers disposed at opposite sides of the electrically conductive lead.

8. A damped flexible cable as recited in claim 4 or 5 further comprising a plurality of electrically conductive leads, a portion of which are parallel to one another.

9. A damped flexible cable as recited in claim 4 or 5 wherein the damping material covers an area at least ½ the area of the flexible cable.

* * * * *